(12) United States Patent
Iida

(10) Patent No.: US 10,591,111 B2
(45) Date of Patent: Mar. 17, 2020

(54) METHOD FOR PRODUCING HIGH-PRESSURE TANK

(71) Applicant: TOYOTA JIDOSHA KABUSHIKI KAISHA, Toyota-shi, Aichi-ken (JP)

(72) Inventor: Yasuhiro Iida, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/161,815

(22) Filed: Oct. 16, 2018

(65) Prior Publication Data

US 2019/0120429 A1 Apr. 25, 2019

(30) Foreign Application Priority Data

Oct. 20, 2017 (JP) ................................. 2017/203712

(51) Int. Cl.
*F17C 1/06* (2006.01)
*B29C 53/80* (2006.01)
(Continued)

(52) U.S. Cl.
CPC .............. *F17C 1/06* (2013.01); *B29C 53/602* (2013.01); *B29C 53/62* (2013.01); *B29C 53/64* (2013.01); *B29C 53/8016* (2013.01); *B29C 70/16* (2013.01); *F16J 12/00* (2013.01); *B29C 53/56* (2013.01); *B29C 53/822* (2013.01); *B29C 2053/8025* (2013.01); *B29K 2101/10* (2013.01); *F17C 2201/0109* (2013.01);
(Continued)

(58) Field of Classification Search
None
See application file for complete search history.

(56) References Cited

U.S. PATENT DOCUMENTS

| | | | |
|---|---|---|---|
| 3,366,522 A | 1/1968 | Underwood | |
| 2013/0248637 A1* | 9/2013 | Tanigawa | ................ B29C 63/08 242/443 |
| 2017/0291352 A1 | 10/2017 | Ueda et al. | |

FOREIGN PATENT DOCUMENTS

| | | |
|---|---|---|
| DE | 102017107110 A1 | 10/2017 |
| GB | 1101280 | 1/1968 |

(Continued)

*Primary Examiner* — Barbara J Musser
(74) *Attorney, Agent, or Firm* — Finnegan, Henderson, Farabow, Garrett & Dunner, LLP

(57) ABSTRACT

A method for producing a high-pressure tank that can, when forming a reinforcement layer following a previous reinforcement layer using fiber bundles, ensure the strength of the tank by reducing disturbance of the orientation of the fiber bundles. The method is adapted to form each reinforcement layer by winding fiber bundles while holding a preset tension for each layer, and includes a winding start step of stopping rotation of the tank liner upon completion of formation of at least one of the reinforcement layers, and, at the start of forming a following reinforcement layer, winding the fiber bundles at a tension smaller than a preset tension for the following reinforcement layer while alternately repeating rotation of the tank liner in the forward direction and the reverse direction, thereby forming a winding start portion of the following reinforcement layer; and a main winding step of winding the fiber bundles at the preset tension after the winding start step, so as to complete the formation of the following reinforcement layer.

3 Claims, 6 Drawing Sheets

(51) Int. Cl.
 B29C 53/60 (2006.01)
 B29C 53/62 (2006.01)
 B29C 70/16 (2006.01)
 B29C 53/64 (2006.01)
 F16J 12/00 (2006.01)
 B29K 101/10 (2006.01)
 B29C 53/82 (2006.01)
 B29C 53/56 (2006.01)

(52) U.S. Cl.
 CPC .. *F17C 2201/054* (2013.01); *F17C 2201/056* (2013.01); *F17C 2201/058* (2013.01); *F17C 2203/0604* (2013.01); *F17C 2203/0609* (2013.01); *F17C 2205/0397* (2013.01); *F17C 2209/2154* (2013.01); *F17C 2221/012* (2013.01); *F17C 2223/0123* (2013.01); *F17C 2223/036* (2013.01); *F17C 2270/0168* (2013.01); *F17C 2270/0184* (2013.01)

(56) References Cited

FOREIGN PATENT DOCUMENTS

| | | |
|---|---|---|
| JP | 2011-236974 | 11/2011 |
| JP | 2017-094518 | 6/2017 |

\* cited by examiner

METHOD FOR PRODUCING HIGH-PRESSURE TANK

CROSS REFERENCE TO RELATED APPLICATIONS

The present application claims priority from Japanese patent application JP 2017-203712 filed on Oct. 20, 2017, the content of which is hereby incorporated by reference into this application.

BACKGROUND

Technical Field

The present disclosure relates to a method for producing a high-pressure tank by forming a fiber-reinforced resin layer on the outer periphery of a tank liner having a storage space.

Background Art

Typically, a high-pressure tank used for a product, such as a pressure-resistant container that is required to have a mechanical property like pressure resistance and a light weight, for example, a fuel cell vehicle, has a fiber-reinforced resin layer formed on the outer periphery of a tank liner having a storage space for storing gas and the like. For forming such a fiber-reinforced resin layer, a filament winding method is used, for example.

As such a filament winding method, JP 2011-236974A discloses a method for producing a high-pressure tank, the method including forming a fiber-reinforced resin layer by continuously winding resin-impregnated fiber bundles around the outer periphery of a tank liner while rotating the tank liner in one direction. According to such a method, the fiber-reinforced resin layer has a plurality of reinforcement layers, and the reinforcement layers are sequentially stacked by winding fiber bundles while holding a preset tension.

SUMMARY

Herein, in the production method such as the one illustrated in JP 2011-236974A, for example, the rotation of the liner may be stopped upon completion of the formation of a single reinforcement layer so as to reduce the tension of the fiber bundles. After that, the rotation of the liner is started again to wind the fiber bundles at a preset tension for the following reinforcement layer so as to form the following reinforcement layer.

However, during the period from when the rotation of the liner is started again to form the following reinforcement layer till the fiber bundles for forming the following reinforcement layer reach the preset tension, the fiber bundles may become tightly wound. Due to such tight winding, the tension may concentrate in the winding start position of the fiber bundles for forming the following reinforcement layer, which can disturb the orientation of the fiber bundles in that position. Consequently, the strength of the high-pressure tank can become low in the position where the orientation of the fiber bundles has been disturbed as the origin.

The present disclosure has been made in view of the foregoing, and provides a method for producing a high-pressure tank that can, when forming a reinforcement layer following a previous reinforcement layer using fiber bundles, ensure the strength of the tank by reducing disturbance of the orientation of the fiber bundles.

In view of the foregoing problem, the inventor has conducted concentrated studies and considered as follows. Specifically, when a reinforcement layer is about to be wound following a previous reinforcement layer, fiber bundles of the previous reinforcement layer have been firmly wound up to its winding end position since the fiber bundles have been wound at a preset tension. Therefore, it is considered that during the period from when the rotation of the liner is started again to form the following reinforcement layer till the tension of the fiber bundles for forming the following reinforcement layer reach the preset tension for following reinforcement layer, the fiber bundles that have been wound become tightened.

Thus, it is considered that a tension that is applied when the fiber bundles become tightened would be received concentrically (at a point) in the winding start position (a single position) of the fiber bundles that are wound in that period, and thus the orientation of the fiber bundles would be disturbed in that position. Therefore, the inventor considered that it may be effective to newly provide a winding region for winding fiber bundles where a tension due to such tight winding would be received, in a region of from the winding end position of the previous reinforcement layer to a position where fiber bundles for forming the following reinforcement layer are started to be wound with its tension increased to approach a preset tension.

The present disclosure has been made in view of the foregoing, and exemplary embodiments relate to a method for producing a high-pressure tank by forming a fiber-reinforced resin layer having a plurality of sequentially stacked reinforcement layers by winding resin-impregnated fiber bundles around the outer periphery of a tank liner having a storage space while rotating the tank liner about the shaft center of the tank liner in one direction, in which each reinforcement layer is formed by winding the fiber bundles while holding a preset tension for each reinforcement layer, the method including a winding start step of stopping the rotation of the tank liner upon completion of the formation of at least one reinforcement layer of the plurality of reinforcement layers, and, at the start of forming the following reinforcement layer, winding the fiber bundles around the at least one reinforcement layer at a tension that is smaller than a preset tension for the following reinforcement layer while alternately repeating rotation of the tank liner in the one direction and a reverse direction thereof, thereby forming a winding start portion of the following reinforcement layer; and a main winding step of winding the fiber bundles at the preset tension after the winding start step, so as to complete the formation of the following reinforcement layer.

According to the present disclosure, at the start of forming the following reinforcement layer, fiber bundles are wound around the tank liner at a tension that is smaller than a preset tension for the following reinforcement layer while rotation of the tank liner in one direction (forward rotation direction) and its reverse rotation (reverse rotation direction) is alternately repeated, so that a winding start portion of the following reinforcement layer can be formed. To form such a winding start portion, the tank liner is rotated in the reverse rotation direction after it is rotated in the forward rotation direction. Therefore, a tension remaining in the fiber bundles, which have been wound during the rotation of the tank liner in the forward rotation direction, can be reduced during the rotation of the tank liner in the reverse rotation direction.

Consequently, since the winding start portion is formed at a tension that is smaller than the preset tension for the following reinforcement layer, even when fiber bundles are tightly wound during the period from when the rotation of the liner is started till the tension of the fiber bundles reach the preset tension in the main winding step, a tension resulting from such tight winding can be dispersed.

Accordingly, when a reinforcement layer is formed following a previous reinforcement layer using continuous fiber bundles, disturbance of the orientation of fiber bundles due to tight winding can be reduced, and thus, a decrease in the strength of the high-pressure tank due to the disturbed orientation of the fiber bundles can be suppressed.

DETAILED DESCRIPTION

Hereinafter, an embodiment of the present disclosure will be described with reference to the drawings.

1. Regarding Apparatus for Producing High-Pressure Tank 1

Figure 1:
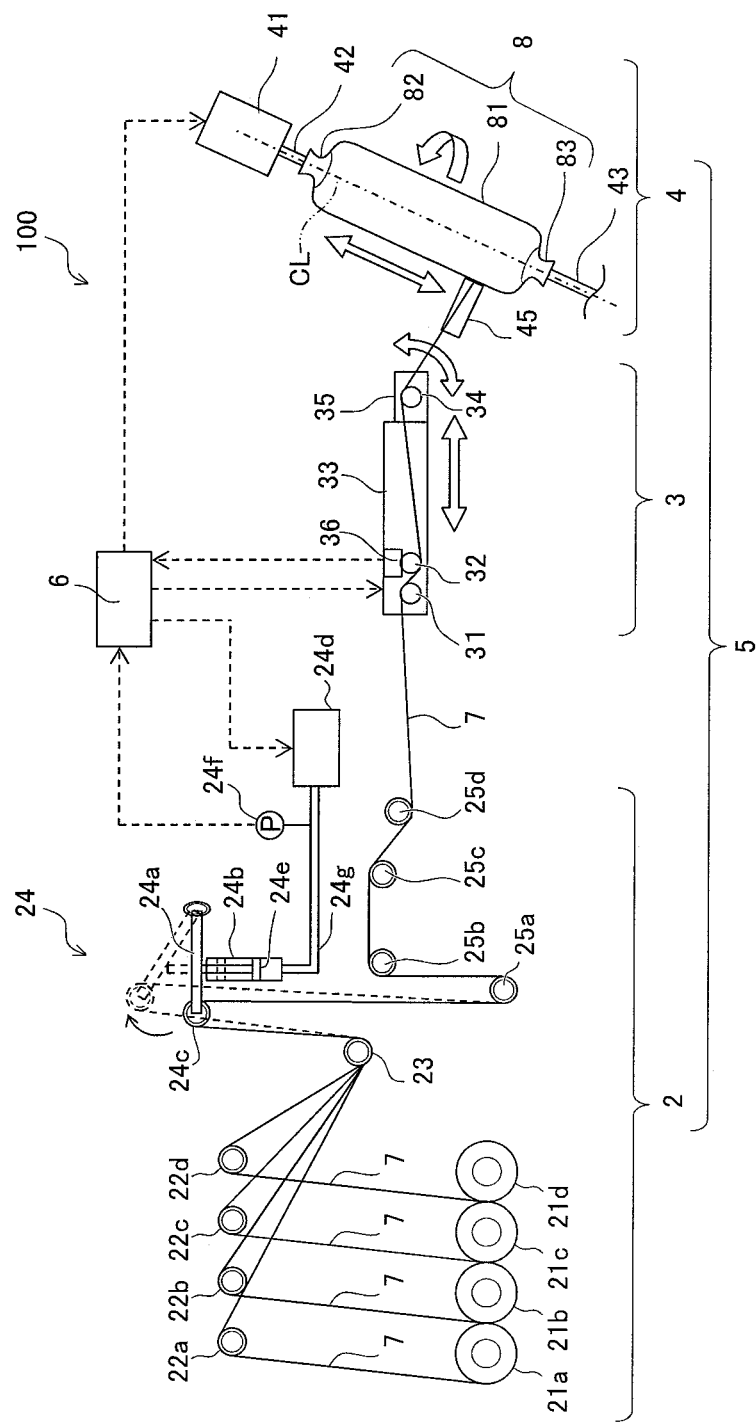
FIG. 1 is a schematic conceptual view of a production apparatus used for a method for producing a high-pressure tank in accordance with this embodiment.

FIG. 1 is a schematic conceptual view of a production apparatus 10 used for a method for producing a high-pressure tank 1 in accordance with this embodiment. The production apparatus 10 is a filament winding apparatus, and includes a fiber unwinding unit 2, a fiber guide unit 3, a winding unit 4, and a control unit 6, and these units constitute a winding device 5 that winds fiber bundles 7 around a tank liner 8 (hereinafter referred to as a "liner 8"). In this embodiment, the liner 8 includes a body 81 having formed therein a storage space for storing high-pressure gas, such as hydrogen gas, and first and second mouthpieces 82, 83 attached to the opposite sides thereof.

The fiber unwinding unit 2 includes a plurality of bobbins 21a to 21d, a plurality of conveying rollers 22a to 22d, a bundling roller 23, and a dancer 24, and has a function of unwinding fiber bundles 7 impregnated with uncured thermosetting resin. The bobbins 21a to 21d are tubular members each having a fiber bundle 7 wound thereon, and are driven with electric motors (not shown) so as to rotate and thus unwind the fiber bundles 7.

The conveying rollers 22a to 22d are provided corresponding to the respective bobbins 21a to 21d, and convey the fiber bundles 7, which have been unwound from the bobbins 21a to 21d, to the bundling roller 23. The bundling roller 23 aligns the fiber bundles 7 unwound from the bobbins 21a to 21d, and feeds them to the dancer 24 as a tension applying device.

The dancer 24 includes a dancer arm 24a, a cylinder 24b, a dancer roller 24c, and an air pressure adjusting device 24d, and has a function of applying a tension to the fiber bundles 7 wound around the liner 8. The dancer roller 24c is rotationally attached to one end of the dancer arm 24a, and the fiber bundles 7 are wound around the dancer roller 24c such that they are hooked by the dancer roller 24c.

The dancer arm 24a rotates vertically as indicated by the arrow in the drawing so as to apply a constant tension to the fiber bundles 7. The cylinder 24b includes a piston 24e connected to the dancer arm 24a, and communicates with the pressure adjusting device 24d via a pipe 24g connecting with a pressure sensor 24f.

The pressure adjusting device 24d is a device for adjusting the pressure of discharged air under the control of the control unit 6 described below, and is a typical device including a compressor and a pressure regulating valve (not shown), for example. The dancer arm 24a of the dancer 24 is rotated with a movement of the piston 24e in accordance with an increase or decrease in the air pressure of the pressure adjusting device 24d, thereby adjusting the tension of the fiber bundles 7. The fiber bundles 7 with the adjusted tension are conveyed to the fiber guide unit 3 via conveying rollers 25a to 25d.

The fiber guide unit 3 has a function of guiding the fiber bundles 7 to the liner 8 by arranging them in parallel. The fiber guide unit 3 includes a fiber assembly portion 33 having first and second guide rollers 31, 32, and a fiber let-off portion 35 having a third guide roller 34.

The fiber assembly portion 33 is movable toward the liner 8 as indicated by the arrow, and the fiber let-off portion 35 is vertically rotatable as indicated by the arrow. The fiber assembly portion 33 arranges the fiber bundles 7 in parallel using the first and second guide rollers 31, 32. The fiber let-off portion 35 conveys the fiber bundles 7 to the liner 8 using the third guide roller 34.

In this embodiment, the fiber bundles 7 enter from the side of the first guide roller 31, and contact the upper outer periphery of the first guide roller 31, the lower outer periphery of the second guide roller 32, and the upper outer periphery of the third guide roller 34 so as to be guided to the liner 8. It should be noted that the second guide roller 32 is provided with a tension measuring portion 36 that measures a force applied by the wound fiber bundles 7, and thus measures the tension of the fiber bundles 7 from the measured force.

The winding unit 4 has a function of winding the fiber bundles 7 around the liner 8 by rotating the liner 8. The liner 8 can reciprocate along the direction of the shaft center CL as indicated by the arrow by means of a moving device (not shown), and is rotatable about the shaft center CL in the longitudinal direction. The winding unit 4 includes an electric rotating device 41 for rotating the liner 8, a rotating rod 42, a support rod 43, and a touch roller 45.

One end of the rotating rod 42 is secured to the rotating device 41, and the other end thereof is secured to the first mouthpiece 82. The support rod 43 supports the liner 8 via the second mouthpiece 83. When the rotating device 41 is operated, the rotating rod 42 rotates so as to cause the liner 8 to rotate in one direction about the shaft center CL in the longitudinal direction, so that the fiber bundles 7 can be wound around the liner 8. Accordingly, continuous fiber bundles 7 are wound around the outer periphery of the liner 8 through a combination of hoop winding and helical winding, for example.

It should be noted that the touch roller 45 is provided at a position where the fiber bundles 7 are wound around the liner 8. Thus, winding the fiber bundles 7 around the liner 8 while pressing the fiber bundles 7 with the touch roller 45 can stabilize the wound state of the fiber bundles 7.

The control unit 6 is adapted to control the operation and stop of the winding device 5 (the fiber unwinding unit 2, the fiber guide unit 3, and the winding unit 4), and the control unit 6 outputs control signals so as to control the aforementioned movement of the fiber guide unit 3 as well as the direction of rotation and the rotational speed of the rotating device 41.

As described above, the control unit 6 controls the tension of the fiber bundles 7 by controlling the pressure adjusting device 24d on the basis of the measured value of the pressure sensor 24f. Specifically, in this embodiment, the tension of the fiber bundles 7 is measured by the tension measuring portion 36, and the pressure adjusting device 24d (or the pressure of the discharged air thereof) is controlled so that the measured tension becomes equal to a preset tension (for example, a preset tension F1 or F2 described below) for the fiber bundles 7.

2. Regarding the Method for Producing the High-Pressure Tank 1

Figure 2:
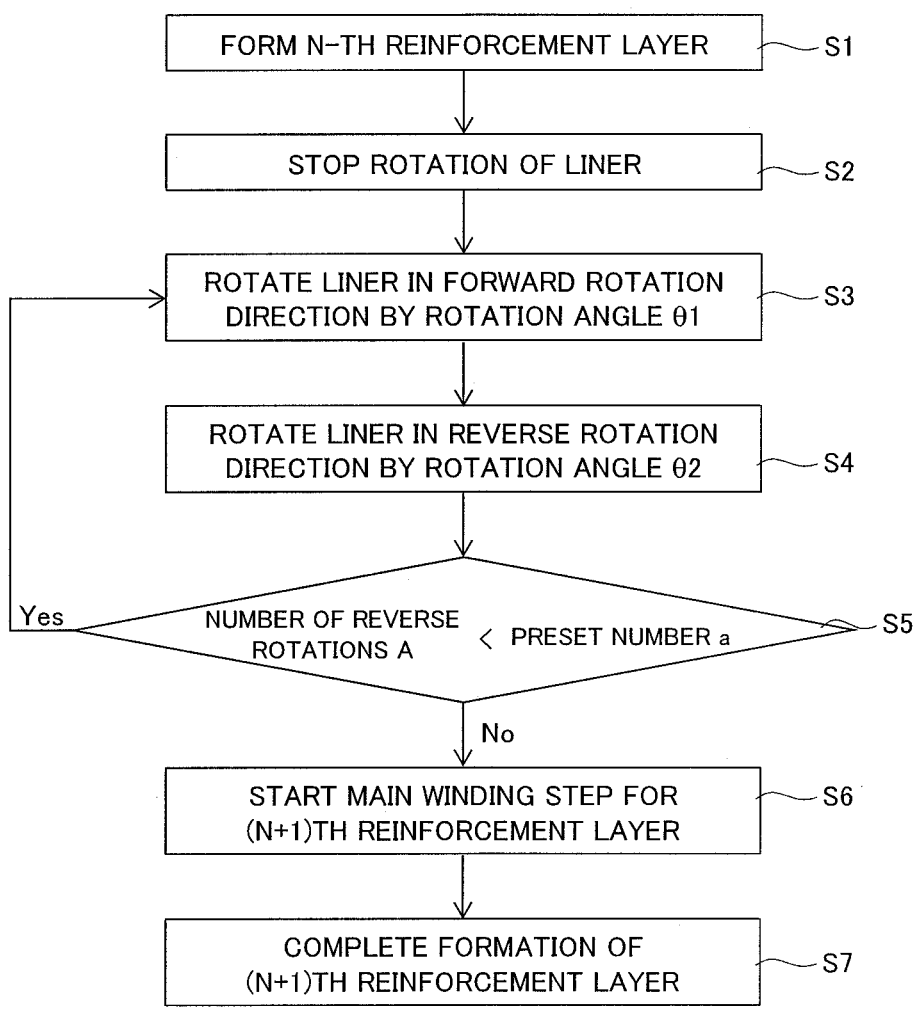
FIG. 2 is a flowchart for forming reinforcement layers in the method for producing the high-pressure tank in this embodiment.
Figure 3:
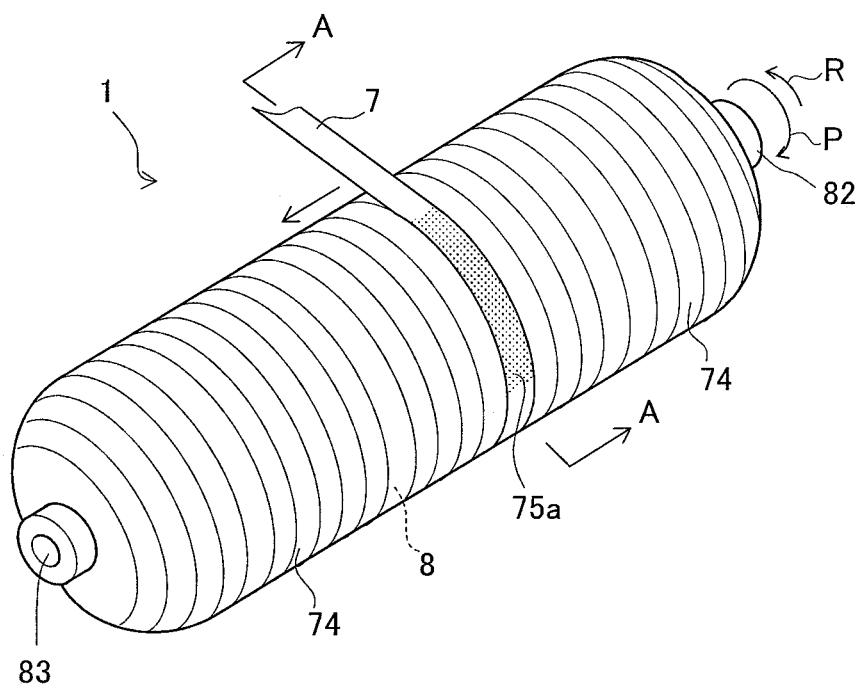
FIG. 3 is a schematic perspective view of the high-pressure tank for illustrating a winding start step in forming a reinforcement layer following a previous reinforcement layer.
Figure 4:
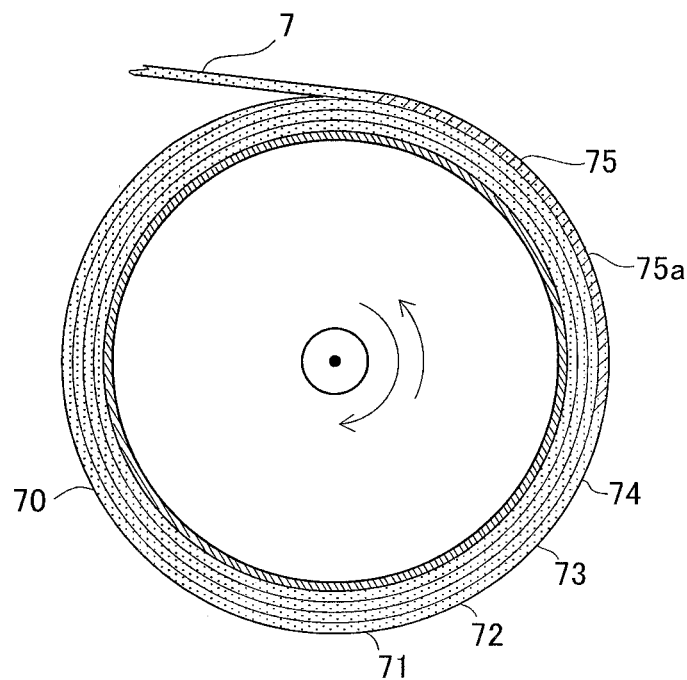
FIG. 4 is a cross-sectional view in the direction of the arrow along line A-A in FIG. 3.
Figure 5:
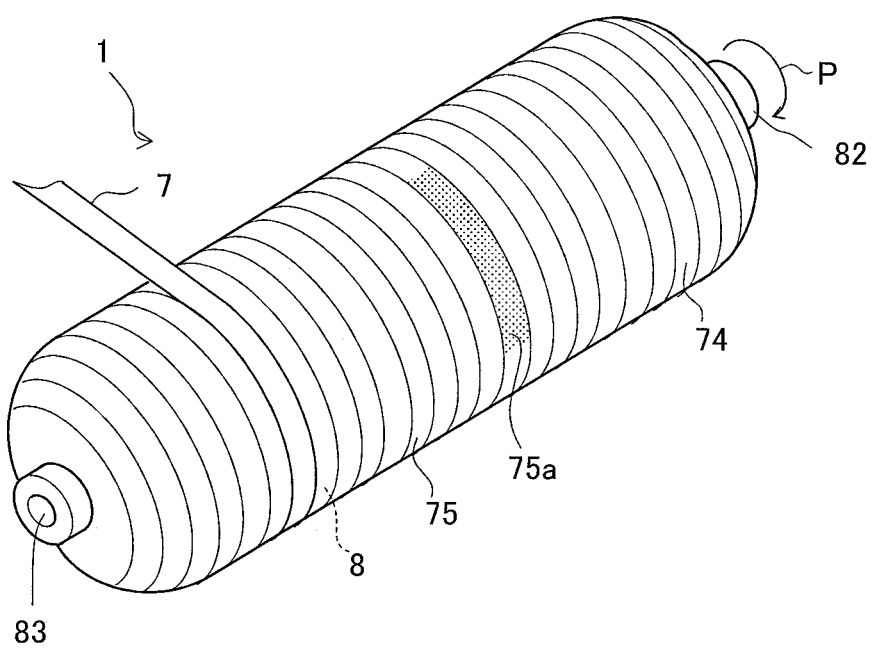
FIG. 5 is a schematic perspective view of the high-pressure tank for illustrating a main winding step.
Figure 6:
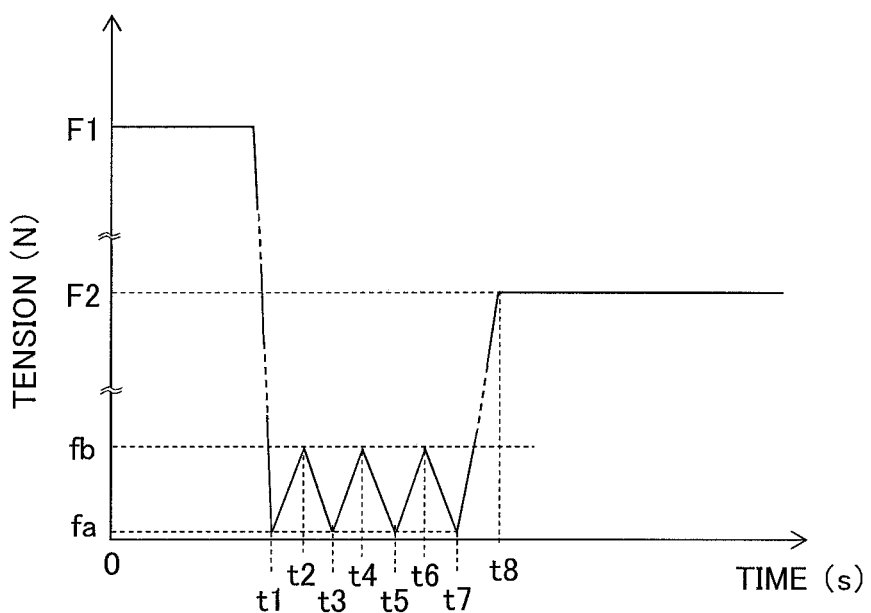
FIG. 6 is a graph for illustrating changes in the tension of fiber bundles with time.
Figure 7:
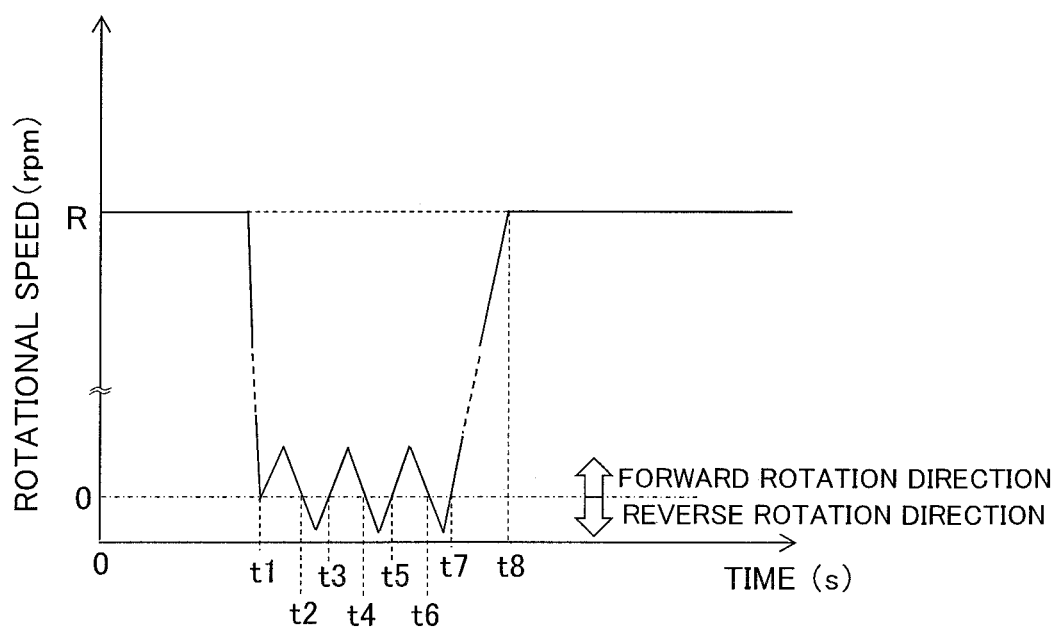
FIG. 7 is a graph for illustrating changes in the rotational speed of a liner with time.

Hereinafter, a method for producing the high-pressure tank 1 in this embodiment will be described. FIG. 2 is a flowchart for forming reinforcement layers in the method for producing the high-pressure tank 1 in this embodiment. FIG. 3 is a schematic perspective view of the high-pressure tank 1 for illustrating a winding start step in forming a reinforcement layer 75 following a reinforcement layer 74. FIG. 4 is a cross-sectional view in the direction of the arrow along line A-A in FIG. 3. FIG. 5 is a schematic perspective view of the high-pressure tank 1 for illustrating a main winding step. FIG. 6 is a graph illustrating changes in the tension of the fiber bundles 7 with time. FIG. 7 is a graph for illustrating changes in the rotational speed of the liner 8 with time. It should be noted that in FIGS. 3 and FIG. 5, each configuration of the winding unit 4 illustrated in FIG. 1 is omitted.

In this embodiment, the fiber bundles 7 impregnated with resin are continuously wound around the outer periphery of the liner 8 while the liner 8 is rotated about the shaft center CL of the liner 8 in the forward rotation direction P (in one direction) so that a fiber-reinforced resin layer 70 is formed on the outer periphery of the liner 8.

In this embodiment, the resin-impregnated fiber bundles 7 are made of continuous reinforcement fibers and are impregnated with uncured thermosetting resin. Examples of continuous fibers include glass fibers, carbon fibers, aramid fibers, alumina fibers, boron fibers, steel fibers, PBO fibers, natural fibers, and high-strength polyethylene fibers.

In addition, examples of thermosetting resin include epoxy resin, modified epoxy resin such as vinylester resin, phenol resin, melamine resin, urea resin, unsaturated polyester resin, alkyd resin, polyurthane resin, and thermosetting polyimide resin.

Although uncured thermosetting resin is given as an example of resin for impregnating the fiber bundles in this embodiment, the resin for impregnating the fiber bundles may be thermoplastic resin as long as such resin can be heated to a temperature of greater than or equal to the softening point (glass transition point) when the fiber bundles 7 are wound around the liner 8. Examples of thermoplastic resin include polyester resin, polypropylene resin, nylon resin (for example, 6-nylon resin or 6,6-nylon resin), polyamide resin, epoxy resin, polycarbonate resin, polyamide resin, acrylic resin, and ABS resin.

The fiber-reinforced resin layer 70 includes a plurality of reinforcement layers 71, 72, . . . , and is formed by sequentially stacking a plurality of reinforcement layers 71, 72, . . . on the outer periphery of the liner 8 by winding continuous fiber bundles 7. It should be noted that FIGS. 3 and 4 exemplarily illustrate the reinforcement layers 71 to 74 and a winding start portion 75a of the following reinforcement layer 75, all of which form the fiber-reinforced resin layer 70.

Each of the reinforcement layers 71, 72, . . . is formed by winding the continuous fiber bundles 7 while holding a preset tension for each of the reinforcement layers 71, 72, . . . . In this embodiment, each of the reinforcement layer 71, 72, . . . starts to be formed when the rotation of the liner 8 is started, and after the tension of the fiber bundles 7 has reached the preset tension, the fiber bundles 7 are wound with the preset tension held so that the formation of the layer is completed when the rotation of the liner 8 is stopped. Next, in order to form the following reinforcement layers 72, 73, . . . , the rotation of the liner 8, which has been stopped, is started again so that the fiber bundles 7 are wound in a similar manner.

Thus, each of the reinforcement layers 71, 72, . . . is a layer that is formed in the period from when the liner 8, which has been stopped, is started to be rotated in the forward rotation direction P to start the winding of the fiber bundles 7 till the rotation of the liner 8 is stopped to complete the winding of the fiber bundles 7 before the following reinforcement layer is wound. It should be noted that each of the reinforcement layers 71, 72, . . . is formed through hoop winding or helical winding.

Although each of the reinforcement layers 71, 72, . . . includes a single layer of the fiber bundles 7 impregnated with resin in FIG. 4, it may include a plurality of layers. It should be noted that in this embodiment, preset tensions for adjacent reinforcement layers (that is, a given reinforcement layer and the following reinforcement layer) may differ such that the preset tension F1 is greater than the preset tension F2. However, the preset tension F2 may be greater than the preset tension F1, or the preset tensions F1, F2 may be equal, for example.

In this embodiment, in order to form a reinforcement layer (an (N+1)th reinforcement layer) following a previous reinforcement layer (an N-th reinforcement layer), a process is performed in accordance with the flow illustrated in FIG. 2. It should be noted that a case where the reinforcement layer 74 is formed through hoop winding following the reinforcement layer 73, which has been formed through hoop winding of the fiber bundles 7, will be described as an example of such flow, with reference to FIGS. 3 to 6.

In this embodiment, first, as illustrated in FIG. 2, the N-th reinforcement layer (the reinforcement layer 74) is formed in step S1. Herein, as illustrated in FIG. 6, in step S1, the fiber bundles 7 are wound around the liner 8 or an (N−1)th reinforcement layer at a preset tension F1 (for example, 400 N) so that the N-th reinforcement layer is formed. At this time, as illustrated in FIG. 7, the rotational speed of the liner 8 is a preset rotational speed V, which is constant, but may be changed depending on the way of winding the fiber bundles 7 or the position of the liner 8 on which the fiber bundles 7 are wound, for example.

In step S2, the rotation of the liner 8 is stopped to complete the formation of the N-th reinforcement layer. Specifically, as illustrated in FIGS. 6 and 7, the tension of the fiber bundles 7 is reduced to a tension fa (for example, 3 N) from the preset tension F1 in accordance with the stop of the liner 8 (specifically, in accordance with a reduction in the rotational speed of the liner 8) at time t1. Herein, the tension fa has a level at which the fiber bundles 7 that are about to be wound will not loosen. In such a state, the formation of the reinforcement layer 74 is completed as illustrated in FIGS. 3 and 4, for example.

It should be noted that as described above, the tension of the fiber bundles 7 is controlled by controlling the dancer 24 with the control unit 6. The rotation of the liner 8 is controlled by controlling the rotating device 41 with the control unit 6.

In step S3, the liner 8 is rotated in the forward rotation direction P by a rotation angle θ1 so that the fiber bundles 7 to be part of the winding start portion of the (N+1)th reinforcement layer are wound around the surface of the N-th reinforcement layer. In some embodiments, the predetermined rotation angle θ1 of the liner 8 in the forward rotation direction P in step S3 is in the range of 15° to 20°.

In this embodiment, in step S3, as illustrated in FIGS. 6 and 7, the liner 8 is rotated in the forward rotation direction P by the rotation angle θ1 during the period of the time t1 to time t2, so that the tension of the fiber bundles 7 being wound reaches a tension fb (for example, 10 N) from the tension fa (for example, 3 N). Herein, the tension of the fiber bundles 7 that are wound in step S3 is smaller than the preset tension F2 for the following reinforcement layer (the (N+1)th reinforcement layer).

It should be noted that in step S3, the tension of the fiber bundles 7 is increased from the tension fa to the tension fb by the dancer 24 in accordance with the winding of the fiber bundles 7 (that is, in accordance with the rotation of the liner in the forward rotation direction) in step S3. Besides, it is also possible to hold the tension of the fiber bundles 7 at the tension fa with the dancer 24 at the start of winding the fiber bundles 7 in step S3 and adjust the rotational speed of the liner 8 so that the tension of the fiber bundles 7 becomes the tension fb with an increase in the tension (or fluctuation of the tension) that occurs while the liner 8 is rotated in the forward rotation direction P. Further, it is also possible to, after the tension of the fiber bundles 7 has reached the tension fb, wind the fiber bundles 7 while holding the tension fb with the dancer 24. In any of the aforementioned cases, it is acceptable as long as the tension fa and the tension fb are smaller than the preset tension F2 for the following reinforcement layer ((N+1)th layer).

Next, the flow proceeds to step S4, and the liner 8 is rotated in the reverse direction (the reverse rotation direction B) of the forward rotation direction P by a rotation angle θ2 that is smaller than the rotation angle θ1 for the forward rotation direction P. Specifically, as illustrated in FIGS. 6 and 7, the liner 8 is rotated in the reverse rotation direction B in the period of the time t2 to time t3. At this time, the tension of the fiber bundles 7 is reduced from the tension fb (for example, 10 N) to the tension fa (for example, 3 N).

Herein, the rotation angle for the reverse rotation direction B is smaller than that for the forward rotation direction P. In some embodiments, if the rotation angle θ1 of the liner 8 in the forward rotation direction P in step S3 is in the range of 10° to 90°, the rotation angle θ2 of the liner 8 in the reverse rotation direction B in step S4 is in the range of 5° to 45°. Alternatively, the rotation angle θ1 is 15° to 20°, and the rotation angle θ2 is 5° to 7°. Accordingly, the winding start portion of the fiber bundles 7 can be favorably formed. In some embodiments, the rotational speed of the liner 8 in steps S3 and S4 is in the range of 5 to 170 rpm, or in the range of 5 to 20 rpm.

It should be noted that in step S4, the tension of the fiber bundles 7 is reduced from the tension fb to the tension fa by the dancer 24 in accordance with the rotation of the liner 8 in the reverse rotation direction. Besides, as described above, if the tension of the fiber bundles 7 has been held at the tension fa by the dancer 24 and increased to the tension fb due to fluctuation upon rotation of the liner 8 in the forward rotation direction P through adjustment of the rotational speed of the liner 8, it is possible to reduce the tension of the fiber bundles 7 to the tension fa during rotation of the liner 8 in the reverse rotation direction B. Besides, for example, it is also possible to, after the tension of the fiber bundles 7 is caused to reach the tension fa by the dancer 24, wind the fiber bundles 7 while holding the tension fa. In any of the aforementioned cases, it is acceptable as long as the tension fa and the tension fb are smaller than the preset tension F2 for the following reinforcement layer ((N+1)th layer).

In particular, since the resin impregnating the fiber bundles 7 is uncured thermosetting resin and has viscosity, there is no possibility that the fiber bundles 7 that have been wound in step S3 may become unwound from the high-pressure tank 1. Further, since the fiber bundles 7 that have been wound in step S3 are pressed again by the touch roller 45 when the liner 8 is rotated in the reverse rotation direction (see FIG. 1), the fiber bundles 7 can be prevented from being unwound from the high-pressure tank 1 further reliably.

Next, the flow proceeds to step S5, and if the number of reverse rotations A is smaller than a preset number a (for example, 3), the flow returns to step S3 so that the steps of from S3 to S5 are repeated until the number of reverse rotations A reaches the preset number a (for example, 3).

Specifically, as illustrated in FIG. 7, the liner 8 is rotated in the forward rotation direction P in the time t3 to t4 and t5 to t6 as in the time t1 to t2, and the liner 8 is rotated in the reverse rotation direction B in the time t4 to t5 and t6 to t7 as in the time t2 to t3.

As described above, the fiber bundles 7 are wound around the N-th reinforcement layer at the tension fb that is smaller than the preset tension F2 for the (N+1)th reinforcement layer while rotation of the liner 8 in one direction (the forward rotation direction P) and the reverse direction thereof (the reverse rotation direction B) is alternately repeated, so that the winding start portion of the (N+1)th reinforcement layer is formed. For example, in FIGS. 3 and 4, the winding start portion 75a of the reinforcement layer 75 that is the following reinforcement layer is formed on the reinforcement layer 74. It should be noted that the "winding start step" as referred to in the present disclosure corresponds to a series of steps S3 to S5 that are repeated (a sub-winding step).

In some embodiments, the area of such winding start portion is in the range of a ¼ turn to a ½ turn in a cross-section that is orthogonal to the shaft center CL of the liner 8, for example, that is, in the range of 90° to 180° around the shaft center CL. If winding is performed in such a range, concentration of tension that may occur when tight winding described below occurs can be reduced.

Next, the flow proceeds to step S6, and a main winding step is started. Specifically, the fiber bundles 7 are wound at the preset tension F2 so that the (N+1)th reinforcement layer is formed. For example, in FIG. 5, the reinforcement layer 75 that is the following reinforcement layer is formed on the reinforcement layer 74.

Herein, in step S6, as illustrated in FIGS. 3, 4, and 6, the fiber bundles 7 are wound around the N-th reinforcement layer (for example, the reinforcement layer 74) with the preset tension F2 (for example, 200 N) held so that the (N+1)th reinforcement layer (for example, the reinforcement layer 75) is formed.

Specifically, the liner 8 is started to be rotated in the forward rotation direction P at time t7, and the tension applied to the fiber bundles 7 is increased to the preset tension F2. After the tension applied to the fiber bundles 7 has reached the preset tension F2 at time t8, the fiber bundles 7 are wound with the tension held so that the (N+1)th reinforcement layer (for example, the reinforcement layer 75) is formed (see FIG. 5). After the fiber bundles 7 have been wound in a predetermined range, the rotation of the liner 8 in the forward rotation direction P is stopped to complete the formation of the (N+1)th reinforcement layer (for example, the reinforcement layer 75). After all of the reinforcement layers are formed, thermosetting resin impregnating the reinforcement layers is heated so as to be cured.

According to this embodiment, at the start of forming the (N+1)th reinforcement layer (for example, the reinforcement layer 75), the fiber bundles 7 are wound at the tension fa, which is smaller than the preset tension F2 for the (N+1)th reinforcement layer (for example, the reinforcement layer 75), while rotation of the liner 8 in the forward rotation direction P and the reverse rotation direction B is alternately repeated. Accordingly, the winding start portion (for example, the winding start portion 75a) of the (N+1)th reinforcement layer (for example, the reinforcement layer 75) can be formed.

To form the winding start portion, the liner 8 is rotated in the reverse rotation direction B after it is rotated in the forward rotation direction P. Therefore, a tension remaining in the fiber bundles 7, which have been wound during the rotation of the liner 8 in the forward rotation direction P, can be reduced during the rotation of the liner 8 in the reverse rotation direction B.

In this manner, in the main winding step of step S6, even when the fiber bundles 7 are tightly wound during the period from when the rotation of the liner 8 is started till the tension of the fiber bundles 7 reaches the preset tension F2, a tension resulting from such tight winding can be dispersed in the winding start portion (for example, the winding start portion 75a) without concentrating in one portion.

Consequently, when the (N+1)th reinforcement layer (for example, the reinforcement layer 75) is formed following the N-th reinforcement layer (for example, the reinforcement layer 74) using the continuous fiber bundles 7, disturbance of the orientation of the fiber bundles 7 due to tight winding can be reduced so that a decrease in the strength of the high-pressure tank 1 due to the disturbed orientation of the fiber bundles 7 can be suppressed.

It should be noted that in this embodiment, the steps illustrated in FIG. 2 may be performed on all of the reinforcement layers or only on selected reinforcement layers that are likely to become tightly wound.

EXAMPLES

Hereinafter, an Example of the present disclosure will be described.

Example

In an Example, a plurality of high-pressure tanks was produced using the method for producing a high-pressure tank described in the aforementioned embodiment. Specifically, as described above, rotation of the liner in the forward rotation direction and the reverse rotation direction was alternately repeated to form a winding start portion such as the one illustrated in FIG. 3 so that a reinforcement layer was formed on the outer periphery of the liner. For the fiber bundles, carbon fibers were used, and for the resin, epoxy resin was used. Rotation in the forward rotation direction and rotation in the reverse rotation direction were repeated four times, and the tension fa was set to 3 N, and the tension fb was set to 10 N. Other tensions were set to the values exemplarily illustrated above.

Comparative Example

A high-pressure tank was produced as in the Example. The Comparative Example differs from the Example in that reinforcement layers were formed without forming their winding start portions such as the one illustrated in FIG. 3.

<Measurement of the Degree of Orientation of Fibers>

Figure 8:
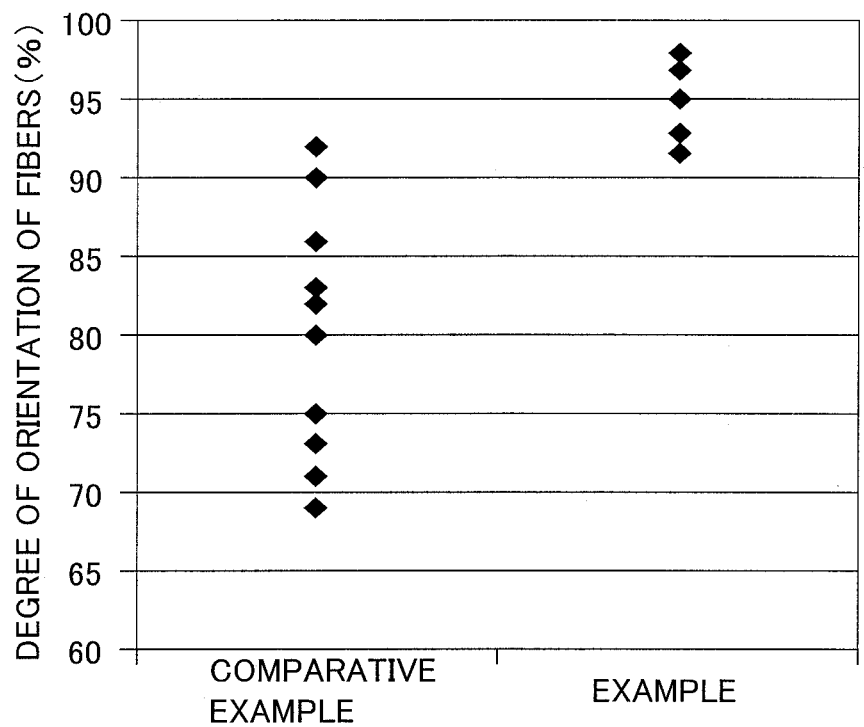
FIG. 8 is a graph of the degree of orientation of fibers in each of fiber bundles of high-pressure tanks in accordance with an Example and a Comparative Example.

Fiber-reinforced resin in the winding start position of each reinforcement layer was cut out of the plurality of reinforcement layers obtained in the Example and the Comparative Example, so that the degree of orientation of fibers in the fiber bundles was measured. The "degree of orientation of fibers" corresponds to, when cutting is performed at an angle of 20° with respect to the direction in which the fiber bundles are oriented, and the aspect ratio of the cross-sectional shape (an elliptical shape) of each reinforcement fiber in the fiber bundles is measured, the proportion of reinforcement fibers whose aspect ratios are within a predetermined range out of 500 reinforcement fibers. That is, the lower the degree of orientation of fibers, the greater the disturbance of the orientation of the fiber bundles. FIG. 8 is a graph illustrating the degree of orientation of fibers in each of the Example and the Comparative Example.

As illustrated in FIG. 8, in the Example, the degree of orientation of fibers in the fiber bundles is greater than or equal to 90% and thus is stable, while in the Comparative Example, variations in the degree of orientation of fibers in the fiber bundles are large. Consequently, it can be said that the orientation of the fiber bundles in the Example is less disturbed than that of the Comparative Example.

<Measurement of Burst Pressure of High-Pressure Tank>

Figure 9:
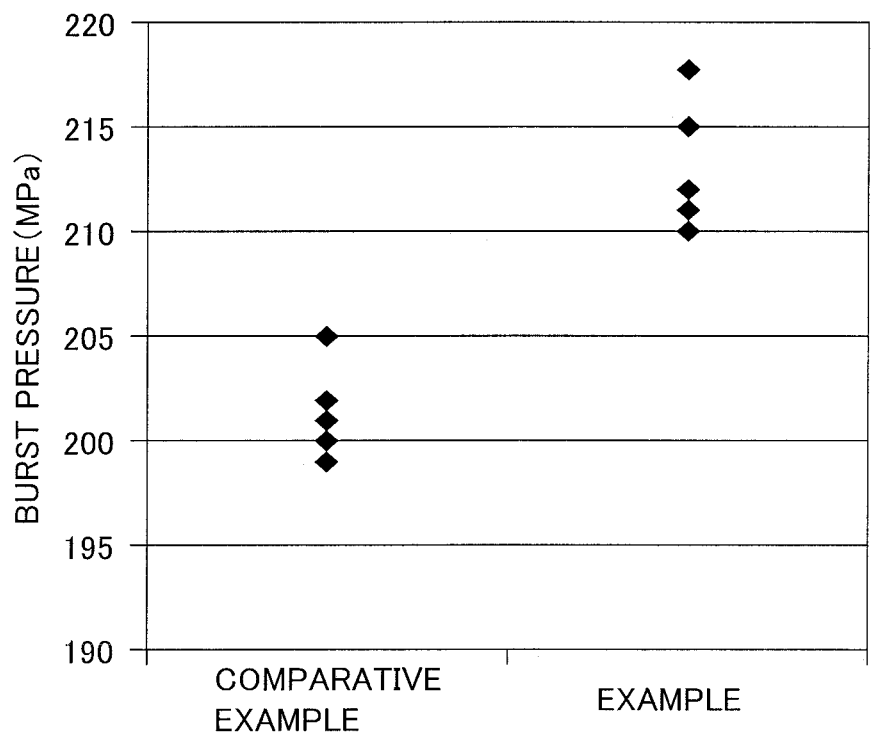
FIG. 9 is a graph of the burst pressure of each of the high-pressure tanks in accordance with the Example and the Comparative Example.

Internal pressure was applied to each of the high-pressure tanks in accordance with the Example and the Comparative Example so that burst pressure was measured. FIG. 9 is a graph of the burst pressure of each of the high-pressure tanks in accordance with Example and Comparative Example. As illustrated in FIG. 9, the burst pressure of the high-pressure tank in accordance with the Example is higher than that of the Comparative Example. Accordingly, it can be said that the burst pressure of the high-pressure tank in accordance with the Example is higher because the high-pressure tank in accordance with the Example has less disturbance of the orientation of the fiber bundles than that of the Comparative Example.

Although an embodiment of the present disclosure has been described in detail above, the present disclosure is not limited thereto, and various design changes are possible within the spirit and scope of the present disclosure recited in the appended claims.

It should be noted that although a tension is applied to fiber bundles using the dancer in the aforementioned embodiment, other types of tension applying devices, for example, may be used instead of the dancer. In addition, although the rotation of the liner in the forward rotation direction is started in step S3 in the aforementioned embodiment, the rotation of the liner may be started in the reverse rotation direction, for example, so that rotation in the forward rotation direction and rotation in the reverse rotation direction are alternately performed.

DESCRIPTION OF SYMBOLS

1 High-pressure tank
7 Fiber bundle
8 Liner
70 Fiber-reinforced resin layer
71 to 75 Reinforcement layers
75*a* Winding start portion
F1, F2 Preset tension
P Forward rotation direction
B Reverse rotation direction

What is claimed is:

1. A method for producing a high-pressure tank by forming a fiber-reinforced resin layer having a plurality of sequentially stacked reinforcement layers by winding resin-impregnated fiber bundles around an outer periphery of a tank liner having a storage space while rotating the tank liner about a shaft center of the tank liner in one direction, wherein:
   each reinforcement layer is formed by winding the fiber bundles while holding a preset tension for each reinforcement layer,
   the method comprising:
   a winding start step of stopping rotation of the tank liner upon completion of formation of at least one reinforcement layer of the plurality of reinforcement layers, and, at a start of forming a following reinforcement layer, winding the fiber bundles around the at least one reinforcement layer at a tension that is smaller than a preset tension for the following reinforcement layer while alternately repeating rotation of the tank liner in the one direction and a reverse direction thereof, thereby forming a winding start portion of the following reinforcement layer; and
   a main winding step of winding the fiber bundles at the preset tension after the winding start step, so as to complete the formation of the following reinforcement layer.

2. The method for producing a high-pressure tank according to claim 1, wherein in the winding start step, an angle of rotation of the tank liner in the one direction is 15° to 20°, and an angle of rotation of the tank liner in the reverse direction is 5° to 7°.

3. The method for producing a high-pressure tank according to claim 1, wherein in the winding start step, an area of the winding start portion is in a range of a ¼ turn to a ½ turn in a direction that is orthogonal to the shaft center of the tank liner.

* * * * *